United States Patent [19]

Cowan et al.

[11] Patent Number: 5,065,654
[45] Date of Patent: Nov. 19, 1991

[54] MACHINE FOR PUNCHING AND SHEARING ANGLE IRON AND FLAT STOCK

[75] Inventors: Louis G. Cowan, Cherry Valley; Dale L. Cardey, Loves Park, both of Ill.

[73] Assignee: W. A. Whitney Corp., Rockford, Ill.

[21] Appl. No.: 594,858

[22] Filed: Oct. 9, 1990

[51] Int. Cl.⁵ .......................... B26D 9/00; B26D 7/02; B26D 7/06

[52] U.S. Cl. ........................................ 83/255; 83/282; 83/436; 83/458; 83/953; 226/181; 269/41

[58] Field of Search ................ 83/282, 262, 436, 458, 83/461, 465, 255, DIG. 2, 953; 226/181, 187, 168; 198/785; 269/156, 41, 164

[56] References Cited

U.S. PATENT DOCUMENTS 3,318,005  5/1967  Petersen ........................... 226/181 X
3,735,907  5/1973  Kuchar et al. ...................... 226/150

OTHER PUBLICATIONS

Six page brochure entitled *CNC Anglematic Systems*, published by W. A. Whitney Corp., Mar. 1983.

Primary Examiner—Douglas D. Watts
Assistant Examiner—Clark F. Dexter
Attorney, Agent, or Firm—Leydig, Voit & Mayer

[57] ABSTRACT

Elongated metal stock is advanced intermittently past punch presses which form holes in the stock when the stock dwells. A shear cuts off successive leading end portions of the stock and forms the stock into short pieces. The same machine is capable of running both angle iron and flat stock without making any significant conversons to the machine between runs. This is achieved through the provision of a feed mechanism and clamping units which are adapted to feed and clamp flat stock as well as angle iron.

18 Claims, 8 Drawing Sheets

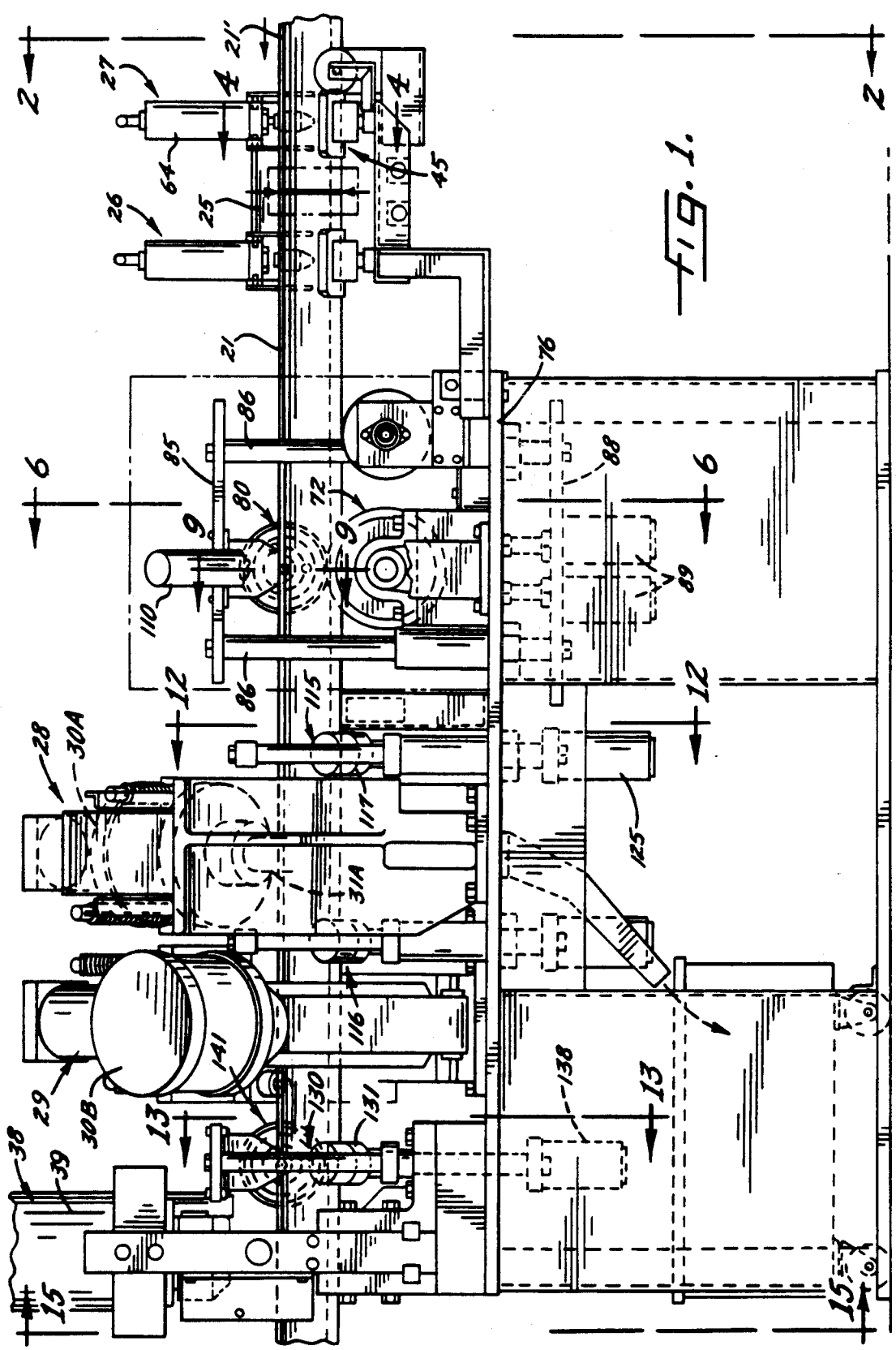

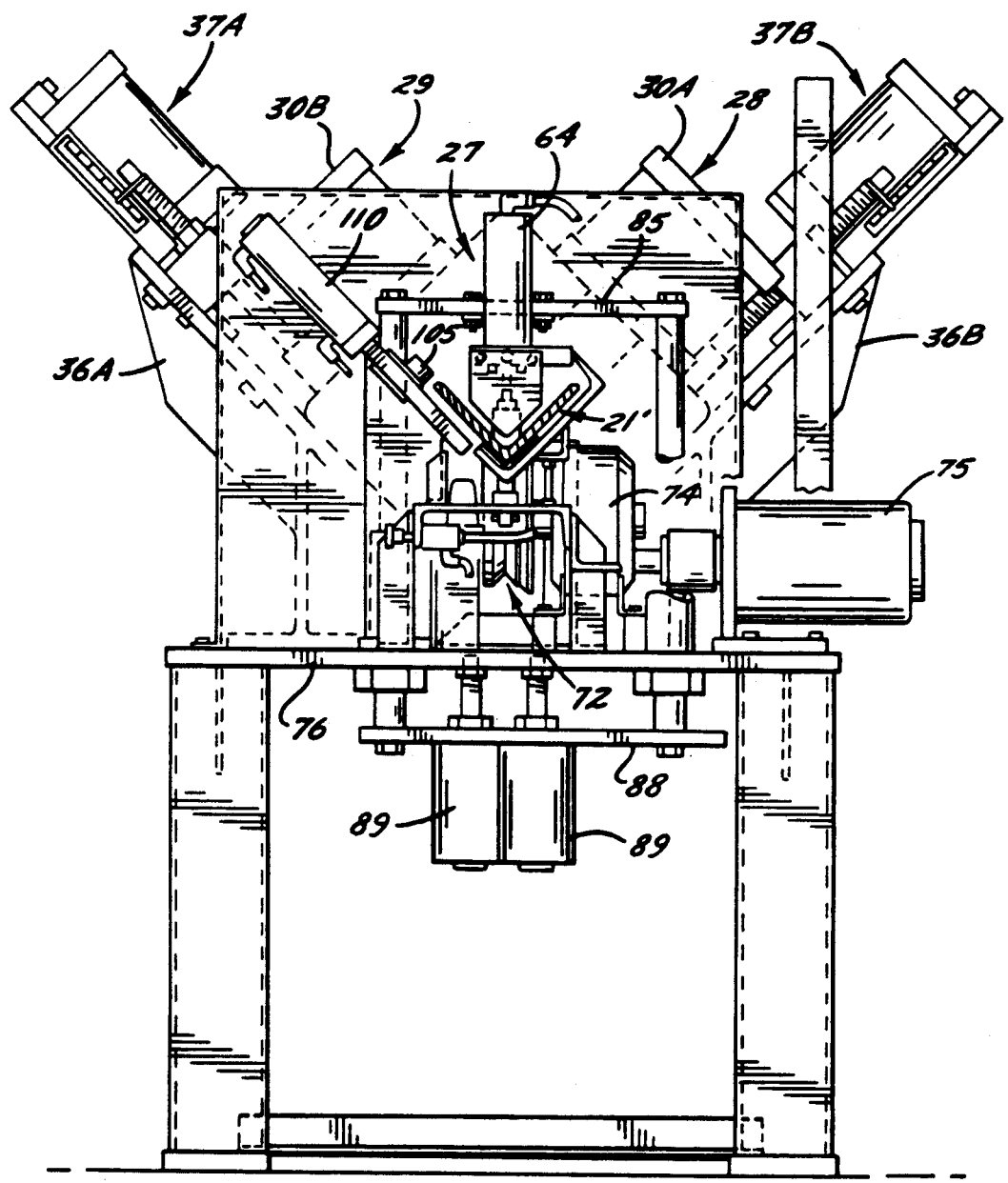
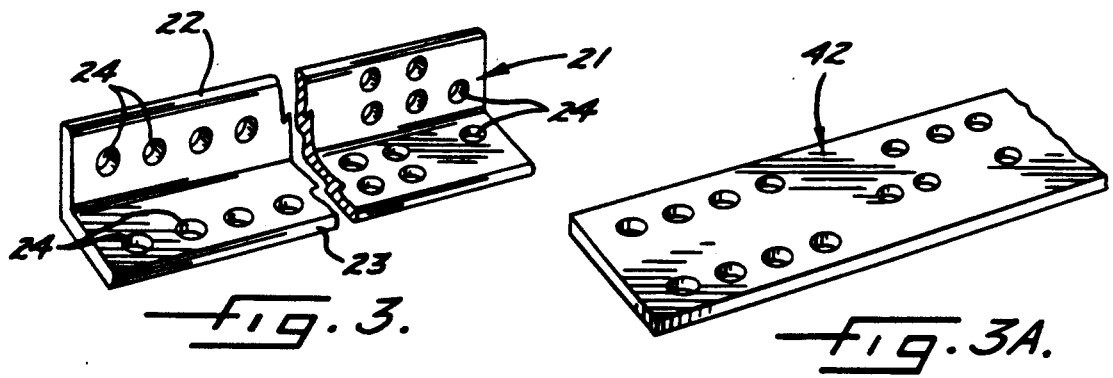

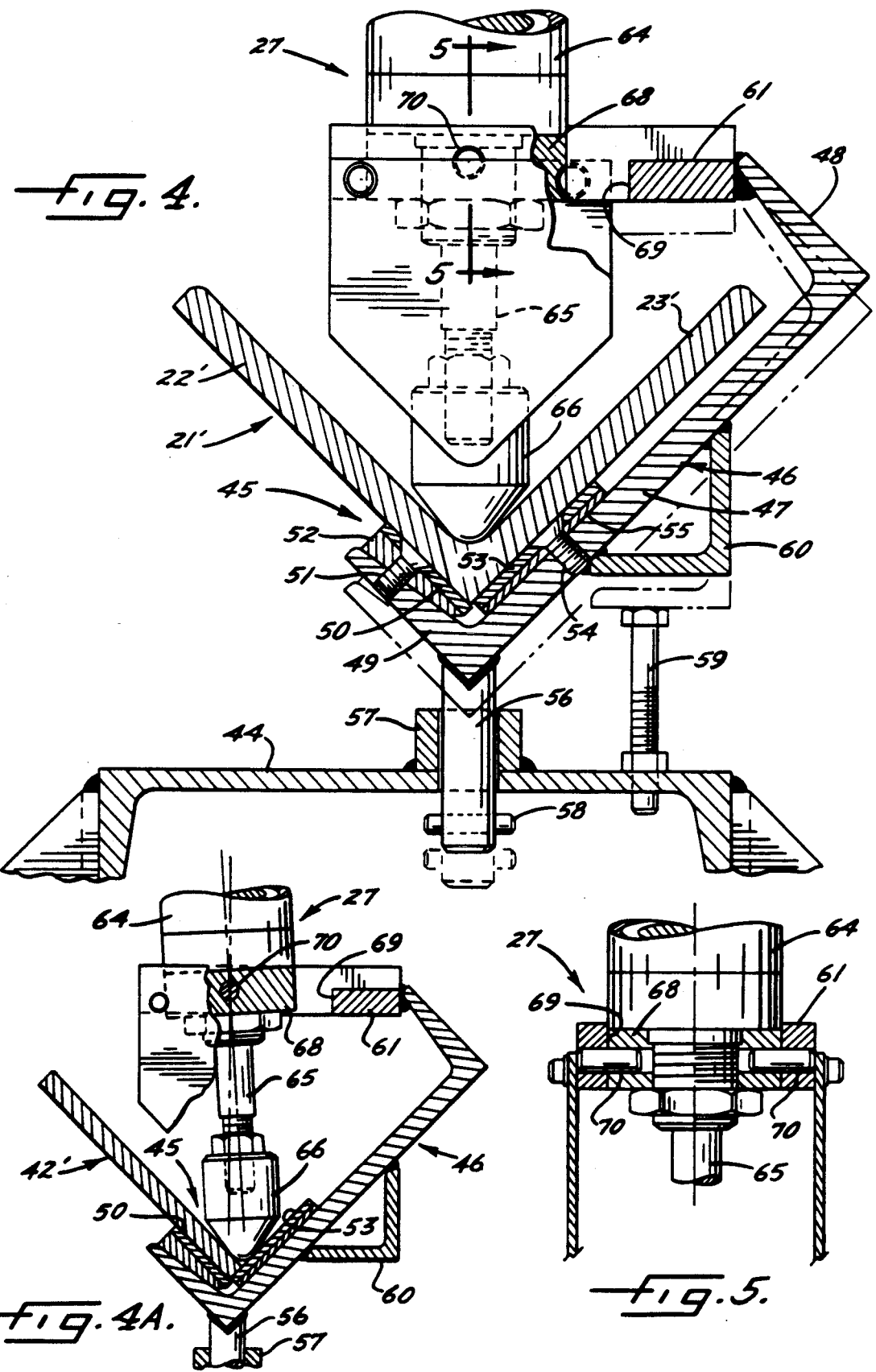

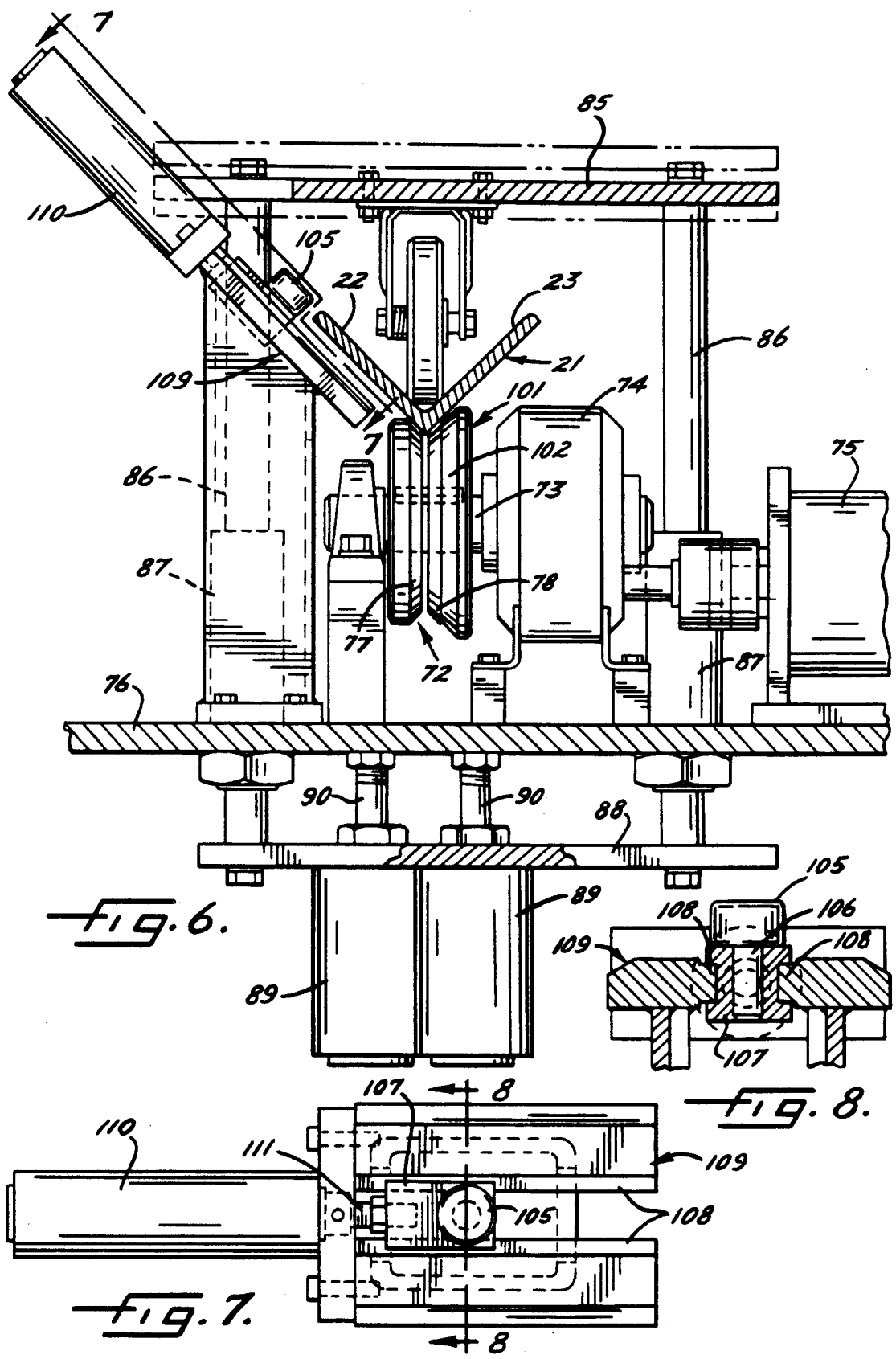

MACHINE FOR PUNCHING AND SHEARING ANGLE IRON AND FLAT STOCK

BACKGROUND OF THE INVENTION

This invention relates generally to a machine for punching holes in an elongated length of metal stock and for shearing the stock into individual pieces.

A machine of this general type is disclosed in Kuchar U.S. Pat. No. 3,735,907. In that machine, an elongated piece of angle iron is fed endwise and intermittently along a generally horizontal path. When the angle iron dwells, it is rigidly clamped and then holes are punched in either or both legs of the angle iron. During a subsequent dwell, the angle iron is again clamped and its leading end portion is cut off by a shear. After repeated cycles, the elongated length of angle iron is cut into several individual pieces each having punched holes in its legs.

In some cases, a second length of angle iron is welded to the first length before the trailing end of the first length is advanced past the upstream end of the machine. In this way, individual lengths of stock are formed into a longer length for handling by the machine.

An angle iron normally is thought of as being L-shaped in cross-section but, in the present machine, the angle iron is oriented such that it defines an upwardly opening V as it is fed through the machine. Thus, various means for supporting, feeding and clamping the angle iron are shaped and designed to accommodate the V-shaped configuration of the angle iron.

Many fabricating shops also have a need to punch and shear elongated lengths of flat stock as well as angle iron. Heretofore, such shops required one machine for handling angle iron and a separate machine for flat stock.

SUMMARY OF THE INVENTION

The general aim of the present invention is to provide a new and improved punching and shearing machine which is capable of running both angle iron and flat stock without making any significant conversions to the machine between runs.

A more detailed object of the invention is to achieve the foregoing by providing a machine in which the various V-shaped supporting, feeding and clamping means are uniquely modified to enable the machine to handle flat stock as well as angle iron.

In still more specific aspects, the invention resides in clamps for holding two pieces of stock during welding, each clamp being capable of pivoting from a normal position for angle iron to a tilted position for flat stock. In addition, the invention is characterized by the provision of a feed roller/pinch roller mechanism which self-adjusts to enable the machine to feed both angle iron and flat stock. The invention also features a roller-type clamp for holding the stock prior to shearing, the clamp also being self-adjustable to accommodate flat stock as well as angle iron.

These and other objects and advantages of the invention will become more apparent from the following detailed description when taken in conjunction with the accompanying drawings.

BRIEF DESCRIPTION OF THE DRAWINGS

FIG. 1 is a front elevational view of a new and improved punching and shearing machine incorporating the unique features of the present invention.

FIG. 2 is an end view of the machine as seen along the line 2—2 of FIG. 1, certain parts being broken away and show in section.

FIG. 3 is a perspective view of a typical angle iron adapted to be handled by the machine and shows the angle iron after being punched.

FIG. 3A is a perspective view of a typical length of flat stock adapted to be handled by the machine and shows the flat stock after being punched.

FIG. 4 is an enlarged fragmentary cross-section taken substantially along the line 4—4 of FIG. 1 and shows the machine handling angle iron.

FIG. 4A is a view similar to FIG. 4 but on a reduced scale and shows the machine handling flat stock.

FIG. 5 is a fragmentary cross-section taken substantially along the line 5—5 of FIG. 4.

FIG. 6 is an enlarged fragmentary cross-section taken substantially along the line 6—6 of FIG. 1 and shows the machine handling angle iron.

FIG. 7 is a plan view as seen along the line 7—7 of FIG. 6.

FIG. 8 is a fragmentary cross-section taken substantially along the line 8—8 of FIG. 7.

DETAILED DESCRIPTION OF THE PREFERRED EMBODIMENT

Figure 9:
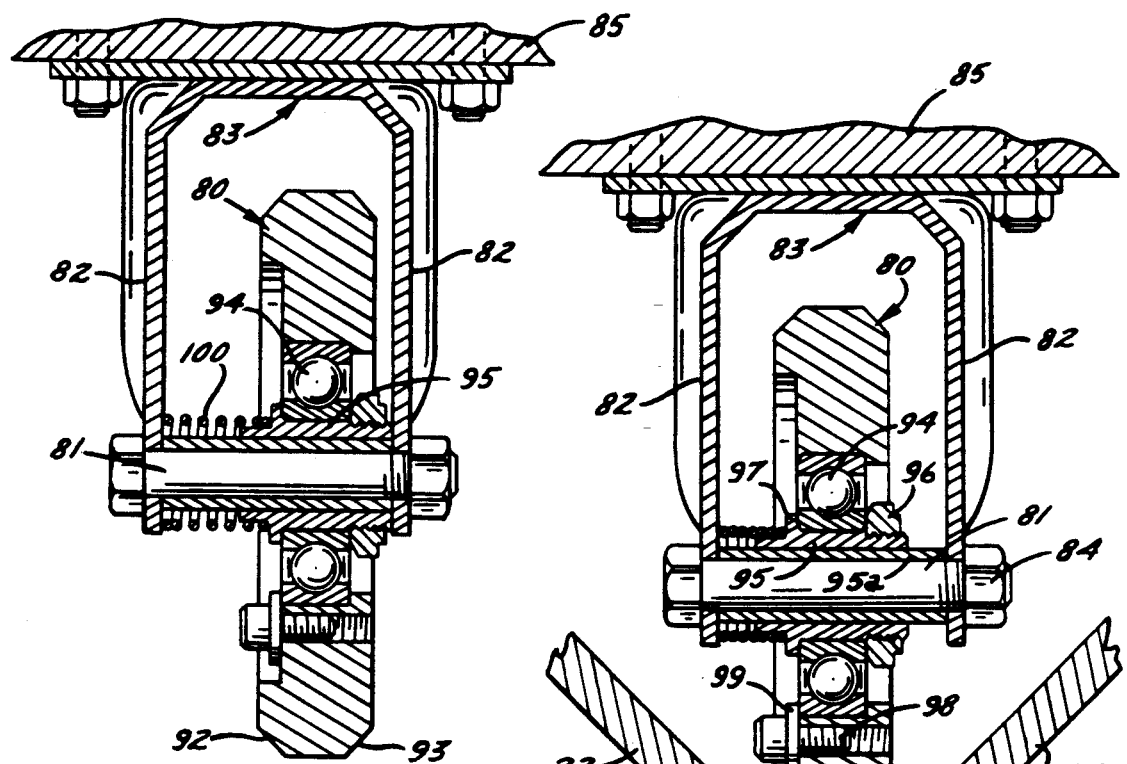
FIG. 9 is a cross-sectional view taken axially through the pinch roller of the feed mechanism along line 9—9 of FIG. 1 and shows the roller as it is positioned when no stock is present.

As shown in the drawings for purposes of illustration, the invention is embodied in a machine 20 for punching holes in an elongated length of stock and for shearing the stock into shorter individual pieces. A typical piece of stock is shown in FIG. 3 and is a metal angle iron 21 of substantially L-shaped configuration and having two legs 22 and 23 disposed at right angles to one another. In this instance, holes 24 are punched in each leg and, at certain longitudinal locations, each leg may be formed with a pair of transversely spaced holes.

The angle iron 21 is advanced intermittently from right-to-left (FIG. 1) along a horizontal path through the machine 20 and while oriented in a position such that the legs 22 and 23 define an upwardly opening V (see FIG. 6). In other words, the angle iron is oriented such that the outside corner at the junction of the legs points vertically downwardly.

Before the trailing end of the angle iron 21 is fed beyond the upstream end of the machine 20, the leading end of another length of angle iron 21' (FIG. 1) may be welded to the trailing end of the angle iron 21. The welding is effected by a welding unit 25 which has been shown schematically in FIG. 1. During the welding, the trailing end portion of the angle iron 21 is held in a fixed position by a clamping unit 26 while the leading end portion of the angle iron 21' is held by an identical clamping unit 27 spaced upstream from the unit 26. An infeed conveyor (not shown) supports the trailing portion of the angle iron 21' during the welding operation.

Figure 15:
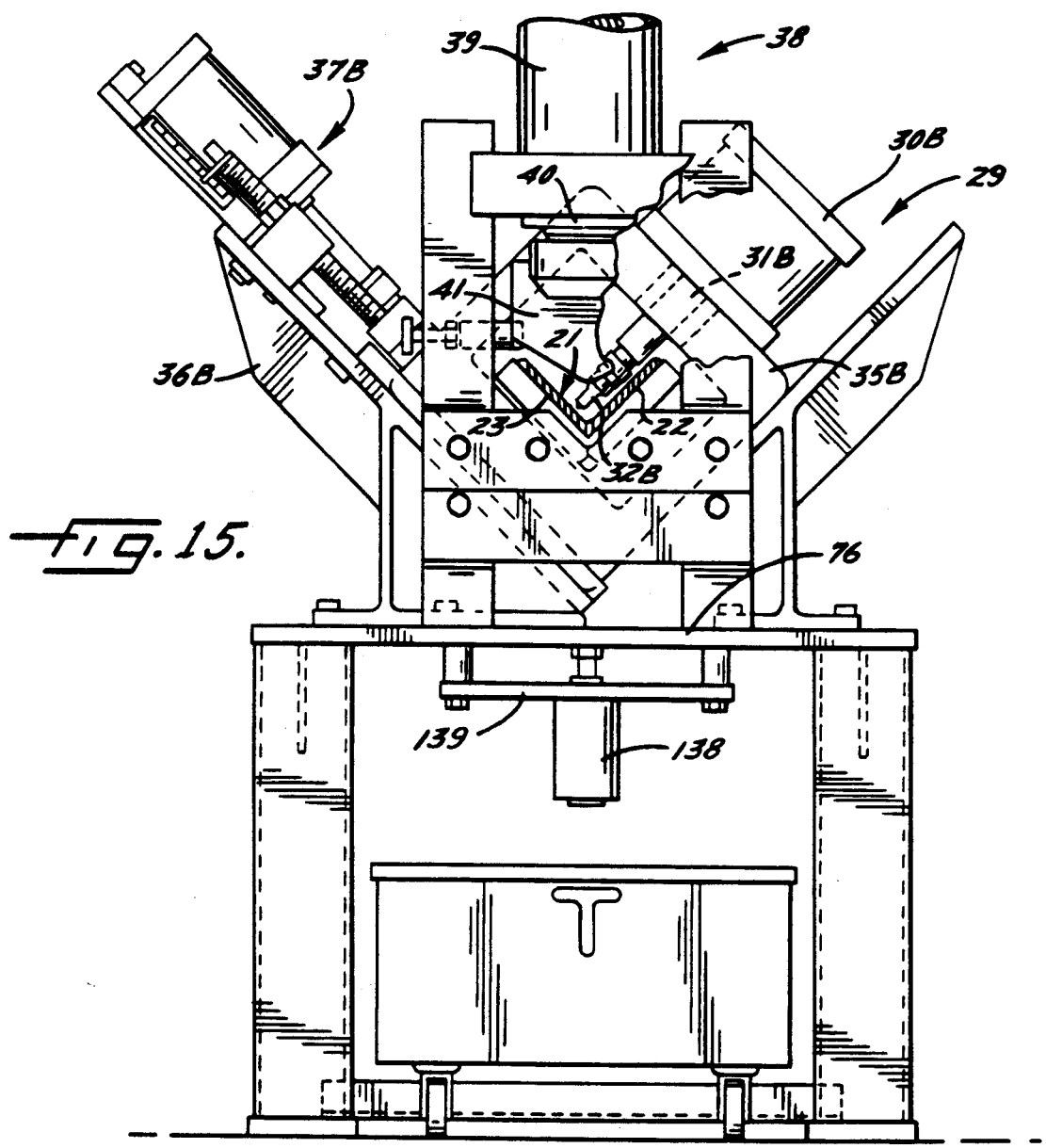
FIG. 15 is an end view of the machine as seen along the line 15—15 of FIG. 1, certain parts being broken away and shown in section.

The angle iron 21 is fed through the machine 20 in short steps and dwells between successive steps. During each dwell, one or more holes 24 may be formed in either or both legs 22 and 23 of the angle iron. Holes are formed in the leg 22 by a hydraulically actuated punch press 28 (FIGS. 1 and 2) while holes are formed in the leg 23 by an oppositely oriented punch press 29 spaced downstream from the press 28 (FIGS. 1, 2 and 15). Other than orientation, the two presses are identical and, for convenience, the reference numerals shown in the drawings for the individual components of the upstream press 28 have been designated with the suffix "A" while the corresponding components of the downstream press 29 have been labeled in the drawings by the same reference numerals but with the suffix "B".

Figure 16:
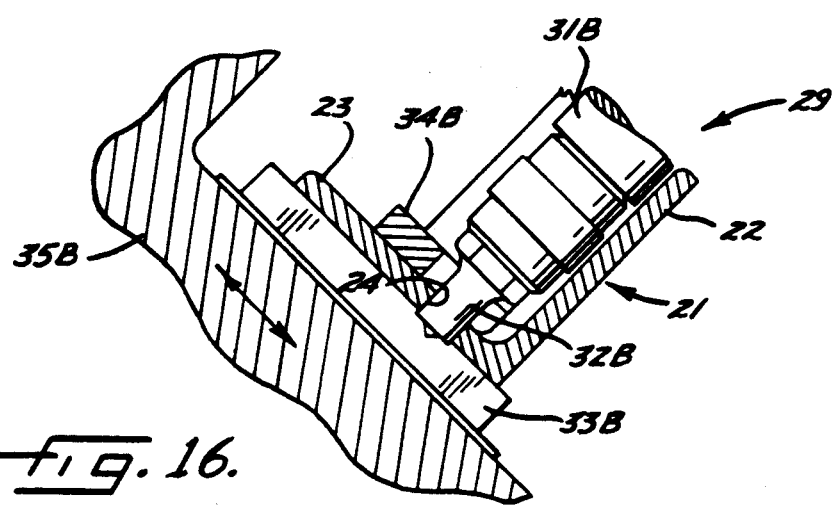
FIG. 16 is a fragmentary cross-section showing one of the punch presses of the machine forming a hole in an angle iron.

Each punch press 28, 29 includes a hydraulically-operated actuator having a cylinder 30 (FIG. 15) and having a ram 31 (FIGS. 15 and 16) adapted to be advanced and retracted upon pressurization of opposite ends of the cylinder. A punch 32 is carried on the lower end of each ram and coacts with a die 33 to punch a hole 24 each time the ram is advanced. When the punch is retracted, a stripper 34 holds the angle iron 21 against the die to prevent the angle iron from raising upwardly with the punch.

The cylinder 30 of each punch press 28, 29 is inclined at a 45 degree angle such that its axis parallels the adjacent leg 22, 23 of the angle iron 21. Each cylinder is supported by a window-like carriage 35 (FIG. 15) which is mounted on a base 36 to slide upwardly and downwardly along a path paralleling the angle iron leg to be punched. An actuating mechanism 37 (FIGS. 2 and 15) is connected to each carriage and is operable to move the carriage, the cylinder, the punch 32 and the die 33 back and forth along the base to enable the punch to form holes at various transverse locations in the angle iron legs 22, 23.

Located at the extreme downstream end of the machine 20 is a shear 38 (FIGS. 1 and 15) which cuts successive leading end portions of the punched angle iron 21 into individual pieces as the angle iron periodically dwells. Herein, the shear includes a hydraulically-operated actuator having a vertically disposed cylinder 39 (FIG. 15) with a ram 40 which is adapted to be advanced downwardly and retracted upwardly by the cylinder. A shear blade 41 is carried on the lower end of the ram and cuts off the leading end portion of the angle iron during the downstroke of the ram.

As described thus far, the machine 20 is typical of machines which have been used successfully for several years by metal fabricating shops for punching and shearing angle iron. Many fabricating shops also have a need to punch and shear elongated lengths of flat stock such as the flat stock 42 shown in FIG. 3A. In order to punch and shear flat stock as well as angle irons, fabricating shops previously have required two separate and dedicated machines.

In accordance with the present invention, the machine 20 is capable of running both angle irons 21 and flat stock 42 without need of making time-consuming modifications to the machine when the operation is switched over from one type of stock to the other type of stock. As a result of the machine 20 being able to handle both types of stock, a fabricating shop need acquire only one machine and can conserve significant floor space.

The foregoing is achieved through the provision of unique means adapted to support, advance and clamp both angle iron 21 and flat stock 42. By way of example, FIGS. 4, 4A and 5 show the upstream clamping unit 27 for holding the trailing length of stock 21', 42' during welding by the welding unit 25. The clamping unit 27 is positioned above a fixed base plate 44 which supports a cradle 45 upon which the stock rests. Herein, the cradle is formed in part by a channel-shaped member 46 (FIG. 4) having a web 47 and upper and lower flanges 48 and 49. The channel member 46 is located in an inclined position such that the lower flange 49 and the lower portion of the web 47 define an upwardly opening V which underlies the V defined by the angle iron 21'.

One side of the cradle 45 is defined by a plate 50 (FIG. 4) which is fastened to the flange 49 by screws 51, there being a shim 52 between the plate and the flange. The other side of the cradle is defined by a plate 53 which is fastened to the lower end portion of the web 47 by screws 54. A shim 55 is sandwiched between the plate 53 and the web 47. As is apparent from FIG. 4, the two side plates 50 and 53 define an upwardly opening V which is substantially congruent with the V defined by the angle iron 21'. During clamping, the legs 22' and 23' of the angle iron 21' seat in tight face-to-face relation with the side plates 50 and 53, respectively, of the cradle 45.

Two vertical pins 56 (only one of which is visible in FIG. 4) are welded to the channel member 46 at the outside corner defined by the junction of the web 47 with the lower flange 49. The pins are supported to slide vertically in bushings 57 welded to the upper side of the base plate 44. Stops 58 on the lower end portions of the pins limit upward movement thereof. Downward movement of the pins 56 and the cradle 45 is limited by a stop screw 59 fastened to and extending upwardly from the base plate 44 and adapted to be engaged by the lower side of an angle member 60 which is welded to the outboard side of the web 47 of the channel member 46.

The upper flange 48 of the channel member 46 is welded to an overhead mounting plate 61 (FIG. 4) which supports the cylinder 64 of a pneumatic actuator. The latter includes a rod 65 which is adapted to be advanced and retracted vertically relative to the cylinder. Downward advancement of the rod is effected when the upper end of the cylinder is pressurized while retraction of the rod is effected by a spring (not shown) in the lower end of the cylinder and serving to retract the rod when pressure is relieved in the upper end of the cylinder. Carried on the lower end of the rod is a clamping nose 66 whose lower end portion is generally frusto-conical and tapers downwardly. The extreme lower end of the nose is rounded and is adapted to fit within the apex of the V defined by the legs 22' and 23' of the angle iron 21'.

When the rod 65 of the cylinder 64 is retracted, no downward force is exerted by the clamping nose 66 against the angle iron 21'. The upstream end portion of the angle iron is held at a fixed elevation by the upstream infeed conveyor and thus the cradle 45 is located in a lowered position as shown in phantom lines in FIG. 4 to relieve clamping pressure from the angle iron and thereby permit endwise advancement of the angle iron.

As the upper end of the cylinder 64 is pressurized, the clamping nose 66 bears downwardly against the angle iron 21'. Since the angle iron is supported at a fixed elevation by the upstream infeed conveyor, the downward force exerted by the clamping nose causes the cylinder 64, the cylinder mounting plate 61, the channel member 46 and the cradle side plates 50 and 53 to move upwardly as permitted by the slidable pins 56. As a result, the plates 50 and 53 of the cradle 45 clamp against the outboard sides of the angle iron legs 22' and 23' while the downward force of the nose 66 acting within the V between the legs causes the legs to seat tightly against the side plates. Accordingly, the angle iron 21' is clamped tightly in a fixed position for welding to the downstream angle iron 21.

When flat stock 42, 42' is being run by the machine 20, the lower end portion of the outboard face of the upstream length of stock 42' lies against the side plate 50 of the cradle 45 as shown in FIG. 4A while the lower edge of the stock rests against the side plate 53. With the flat stock so positioned, the V defined by the upper face of the flat stock and the upper face of the side plate 53 is not congruent with the V defined by the upper sides of the two side plates 50 and 53 but instead the former V is offset transversely to the right from the latter V. In carrying out the invention, the cylinder 64 is supported to pivot relative to the mounting plate 61 in order to enable the clamping nose 66 to seat against both the flat stock 42' and the side plate 53 and thereby effect secure clamping of the flat stock in the cradle 45.

For this purpose, a mounting block 68 (FIG. 5) is fixed to the lower end of the cylinder 64 and is located with a transversely elongated opening 69 (FIG. 4) formed in the mounting plate 61. Pivot pins 70 are secured tightly in holes in the mounting plate 61 and are pivotally received in holes in the cylinder mounting block 68. The pivot pins are spaced diametrically from one another around the cylinder and their axes are parallel to the longitudinal direction of movement of the stock.

By virtue of the pivot pins 70, the cylinder 64 and the clamping nose 66 may swing from the position shown in FIG. 4 to the position shown in FIG. 4A. Thus, when the clamping nose is advanced downwardly into engagement with flat stock 42', it contacts the upper side of such stock and then, as permitted by the pins 70, pivots counterclockwise into engagement with the side plate 53 of the cradle 45 as shown in FIG. 4A. In this way, the same clamping nose 66 which is oriented vertically for the angle iron 21' may self-oriented adjust for flat stock 42' and securely lock the flat stock in the cradle 45.

In passing, it will be noted that the lower edges of the side plates 50 and 53 of the cradle 45 are positioned closely adjacent one another. This prevents the lower edge portion of relatively thin flat stock from slipping into the space between the lower edges of the side plates.

The downstream clamping unit 26 is substantially identical to the upstream clamping unit 27 and need not be described in detail. It will suffice to say that the leading length of angle iron 21 or flat stock 42 adapted to be held by the downstream clamping unit 26 is located at a fixed elevation by means to be described subsequently and that the cradle of the downstream clamping unit 26 moves upwardly into engagement with the angle iron or flat stock when the clamping unit is actuated.

Further in keeping with the invention, provision is made of unique feed means for advancing both angle iron 21 and flat stock 42 lengthwise through the machine 20. Herein, such feed means are located downstream of the clamping unit 26 and comprise a sheave 72 (FIGS. 1 and 6) fixed to rotate with the horizontally and transversely extending output shaft 73 (FIG. 6) of a speed reducer 74 which is adapted to be driven intermittently by an electric drive motor 75. The speed reducer and the motor are supported on a fixed base plate 76.

Figure 10:
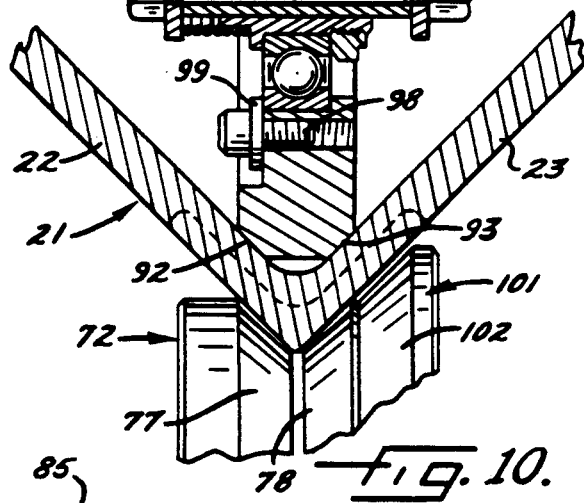
FIG. 10 is a view similar to FIG. 9 but shows the pinch roller positioned to ride against angle iron.

As shown most clearly in FIG. 10, the drive sheave 72 is formed with a circumferentially extending groove defined by first and second inclined sides 77 and 78 of substantially equal length, each of the sides defining a substantially frustoconical surface. The two surfaces 77 and 78 define an upwardly opening V which is congruent with the V defined by the angle iron 21.

Coacting with the sheave 72 to feed the stock is an overhead pinch roller 80 (FIG. 10) which presses the stock downwardly against the sheave. The pinch roller is supported to rotate about the axis of a transversely extending bolt 81 which spans the legs 82 of an inverted U-shaped mounting bracket 83 and is secured thereto by a nut 84.

The mounting bracket 83 is carried by the underside of an overhead mounting plate 85 (FIG. 6) which is supported by vertical rods 86 adapted to slide upwardly and downwardly in bushings 87 on the base plate 76. At their lower ends, the rods are attached to a lower plate 88 which carries the cylinders 89 of two pneumatic actuators. A rod 90 extends upwardly from each cylinder and is fixed to the lower side of the base plate 76.

When the lower ends of the cylinder 89 are pressurized, the cylinders are forced downwardly along with the plate 88, the rods 86 and the overhead mounting plate 85. This causes the pinch roller 80 to move downwardly into tight engagement with the upper side of the angle iron 21 and to press the angle iron tightly against the sides 77 and 78 of the sheave 72. Thus, rotation of the sheave effects advancement of the angle iron by virtue of the frictional engagement of the sheave with the angle iron. When the pressure in the lower ends of the cylinders 89 is relieved, springs (not shown) in the upper ends of the cylinders return the pinch roller 80 upwardly to enable initial threading of stock between the pinch roller and the sheave.

As shown most clearly in FIG. 9, the pinch roller 80 is in the form of a circular wheel having substantially frustoconical peripheral side surfaces 92 and 93 which taper in axially opposite directions. When the pinch roller is in its lowered active position, the side surfaces 92 and 93 engage and substantially conform to the upper sides of the legs 22 and 23, respectively, of the angle iron 21 as shown in FIG. 10.

When the machine 20 is running flat stock 42, the lower face of the lower edge portion of such stock lies against the sloped side 77 of the sheave 72 while the extreme lower edge of the flat stock abuts the opposite side 78 of the sheave. In accordance with the invention, the pinch roller 80 is constructed to hold the flat stock in frictional engagement with the sheave without substantial side thrust being imposed on the pinch roller. To this end, the pinch roller is supported to move axially as necessary to conform to the flat stock and, at the same time, to engage a portion of the sheave so as to resist side thrust imposed on the roller by the flat stock.

More specifically, the pinch roller 80 is supported to rotate with the outer race of a ball bearing 94 (FIG. 10) whose inner race is fixed to a sleeve 95 adapted to slide axially on a second sleeve 95a on the bolt 81. A lock nut 96 is threaded onto one end portion of the sleeve 95 and clamps the inner race of the bearing against a radial shoulder 97 on the opposite end portion of that sleeve. Angularly spaced screws 98 are threaded into one side of the pinch roller and include flanged heads 99 which clamp the roller to the outer race of the bearing.

Pursuant to the invention, the pinch roller 80 is biased to slide axially away from the side 77 of the sheave 72 and toward the side 78 thereof. For this purpose, a coil spring 100 (FIG. 10) is telescoped over the sleeve 95 and is compressed between the shoulder 97 and the adjacent leg 82 of the bracket 83. Thus, the spring 100 urges the roller transversely from left-to-right and, when no stock is present, the roller is located in a far right position as shown in FIG. 9 with the right end of the sleeve 95 engaging the adjacent leg 82 of the bracket 83.

When the pinch roller 80 is shifted downwardly toward the angle iron 21, the right side portion 93 of the roller engages the upper side of the angle iron leg 23. This cams the roller axially to the left from the position shown in FIG. 9 to the position shown in FIG. 10. In the latter position, the roller is centered transversely with respect to the angle iron 21, and the side portions 92 and 93 of the roller press the angle iron legs 22 and 23 against the sides 77 and 78 of the sheave 72 to establish good frictional contact.

Advantageously, the sheave 72 is formed with an extension 101 (FIG. 10) which is located axially outwardly of the side 78 of the sheave and which is engaged by the side portion 93 of the roller 80 when the machine 20 is running flat stock 42. Herein, the extension 101 includes an annular frustoconical surface 102 which is coaxial with and is of the same slope as the side 78 of the sheave 72. The smallest diameter of the frustoconical extension surface 102, however, is offset radially inwardly from the largest diameter of the frustoconical side 78 of the sheave.

Figure 11:
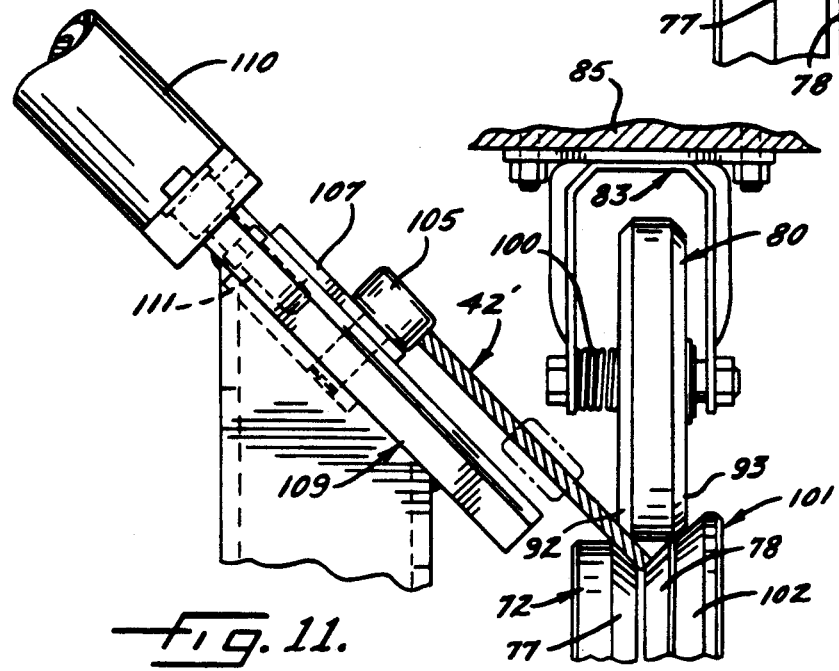
FIG. 11 is a view similar to FIG. 6 but shows the machine handling flat stock.

When the machine 20 is set up to run flat stock 42, lowering of the pinch roller 80 causes the right side portion 93 of the roller to engage the frustoconical surface 102 of the sheave extension 101 as shown in FIG. 11. Such engagement cams the roller to the left against the bias of the spring 100 and causes the left side portion 92 of the roller to engage the upper side of the flat stock 42 and press the stock against the side 77 of the sheave 72. Because the right side portion 93 of the roller 80 rides along and is backed by the frustoconical extension surface 102, the roller is prevented from shifting to the right and is held in firm contact with the flat stock.

Because the frustoconical surface 102 of the extension 101 is offset radially inwardly from the adjacent side 78 of the sheave 72, such surface does not contact and drive against the leg 23 of the angle iron 21 but instead is spaced downwardly from the leg 23 as shown in FIG. 10. As a result, the frictional drive to the angle iron is produced uniformly by the sheave sides 77 and 78 of equal length and the drive is not affected by the frustoconical extension surface 102.

To promote uniform feeding of the flat stock 42, a roller 105 (FIGS. 6, 7, 8 and 11) presses against the outboard edge of the flat stock and pushes the inboard edge of the flat stock against the side 78 of the sheave 72. The roller is supported by a spindle 106 (FIG. 8) to turn about an axis extending perpendicular to the upper face of the flat stock. The spindle, in turn, is supported by a slide block 107 which is guided to move inwardly and outwardly along a path which is inclined at the same angle as the flat stock. As shown in FIG. 8, the slide block is formed with grooves which receive rails 108 on a fixed support structure 109, the grooves and rails coacting to guide the slide block.

Inward and outward movement of the roller 105 is effected by a cylinder 110 (FIGS. 6, 7 and 11) mounted on the support structure 109 and having a rod 111 connected to the outer end of the slide block 107. When the rod is advanced, the roller 105 presses against the outer edge of the flat stock 42 to push the inner edge of the stock tightly against the side 78 of the sheave 72. Retraction of the rod pulls the roller outwardly to an inactive position shown in FIG. 6 so that stock may be initially fed into the machine. During operation, the roller also engages the angle iron leg 22 but no beneficial purpose is served by such engagement since adequate feeding of angle iron is effected through the coaction of the sheave 72 and the pinch roller 80.

Figure 12:
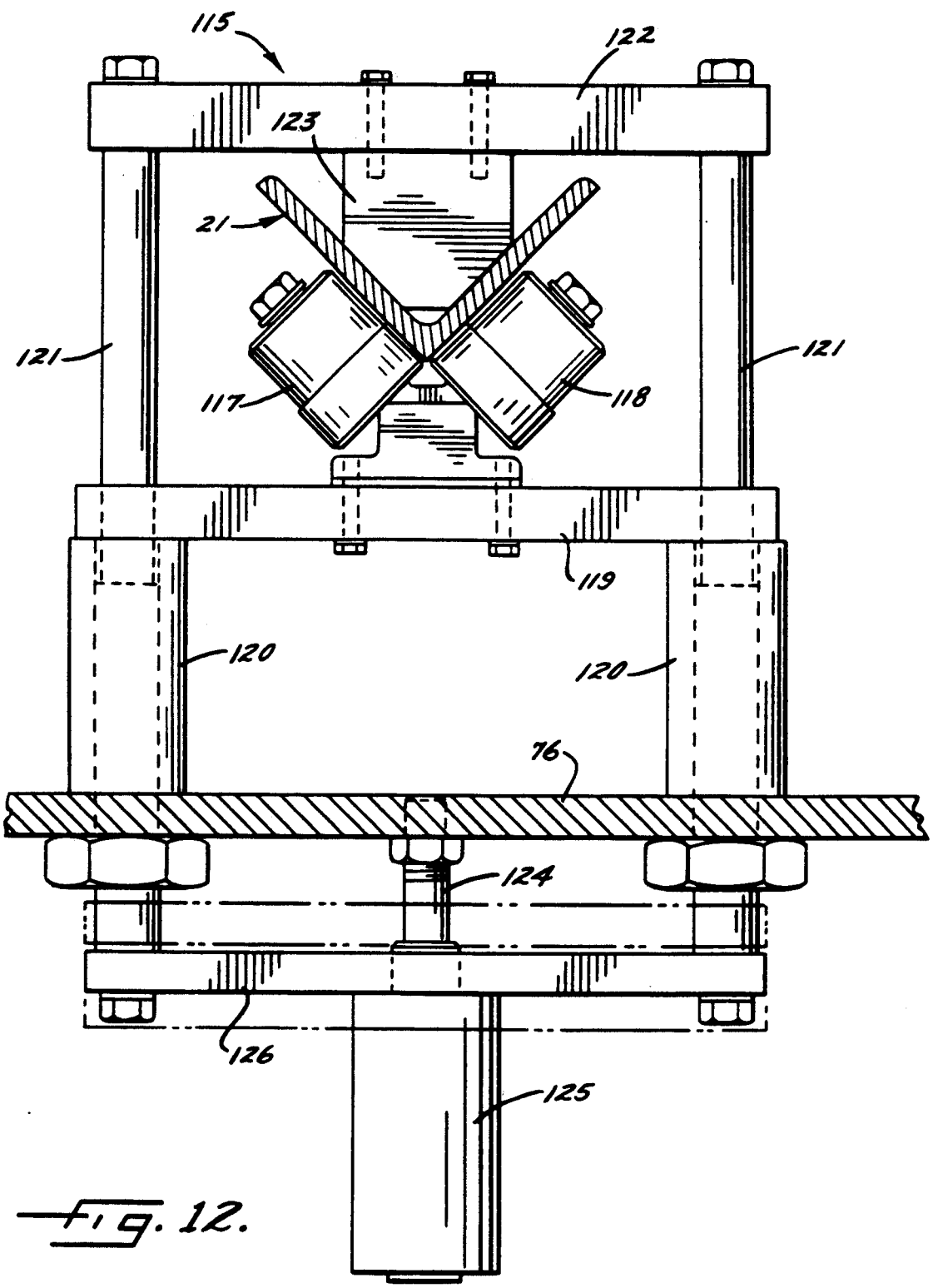
FIGS. 12 and 13 are enlarged fragmentary cross-sections taken substantially along the lines 12—12 and 13—13, respectively, of FIG. 1 and show the machine handling angle iron.

Identical clamping units 115 and 116 (FIG. 1) are located just upstream and just downstream, respectively, of the punch press 28 and hold the stock during punching. The clamping unit 115 is shown in FIG. 12 and comprises a pair of rotatable V-rollers 117 and 118 supported by a plate 119. The latter is supported on the upper ends of bushings 120 which are secured to the fixed base plate 76. Rods 121 extend slidably through the bushings and, at their upper ends, are connected to an overhead mounting plate 122. Fixed to and depending from the mounting plate 122 is a clamp shoe 123 whose lower end is in the form of a truncated V. The clamp shoe 123 is used both for angle iron 21 and for flat stock 42 to push the stock against the rollers 117 and 118. The lower ends of the rollers are positioned sufficiently close together to prevent flat stock from sliding downwardly between the rollers.

Up and down movement of the clamping shoe 123 is effected by a pneumatic actuator having a rod 124 (FIG. 12) fixed to the base plate 76 and having a cylinder 125 connected to a plate 126 which is secured to the lower ends of the rods 121. When the lower end of the cylinder 125 is pressurized, the cylinder moves downwardly and acts through the plate 126, the rods 121 and the overhead mounting plate 122 to shift the clamping shoe 123 downwardly into clamping engagement with the stock.

Another clamping unit 130 (FIGS. 1 and 13) is located between the punch press 29 and the shear 38 and acts to hold the stock down when the free end portion of the stock is cut off by the shear. The clamping unit 130 includes an upwardly opening V-shaped cradle defined by a pair of rollers 131 and 132 which are inclined so as to define a V beneath the path traveled by the stock. The rollers are supported on a plate 133 supported on the upper ends of bushings 134 supported by the base plate 76. Vertical rods 135 extend slidably through the bushings and are connected at their upper ends to an overhead support plate 136. Up and down movement of the overhead plate 136 is produced by a pneumatic actuator having a rod 137 fixed to the base plate 76 and having a cylinder 138 fixed to a plate 139 which is connected to the lower ends of the rods 135.

Supported on the lower side of the overhead plate 136 is a bracket 140 similar to the bracket 83 and carrying a roller 141 which is similar to the roller 80, the roller 141 having oppositely inclined frustoconical sides 142 and 143. The roller is supported to rotate about the axis of a transversely extending bolt 144 carried by the bracket 140. The roller 141 also is slidable along the bolt 144 but, in this instance, is biased to slide from right-to-left by a coil spring 145 on the bolt. The center of the bracket 140 is located to the right of the center of the V defined by the rollers 131 and 132.

Figure 13:
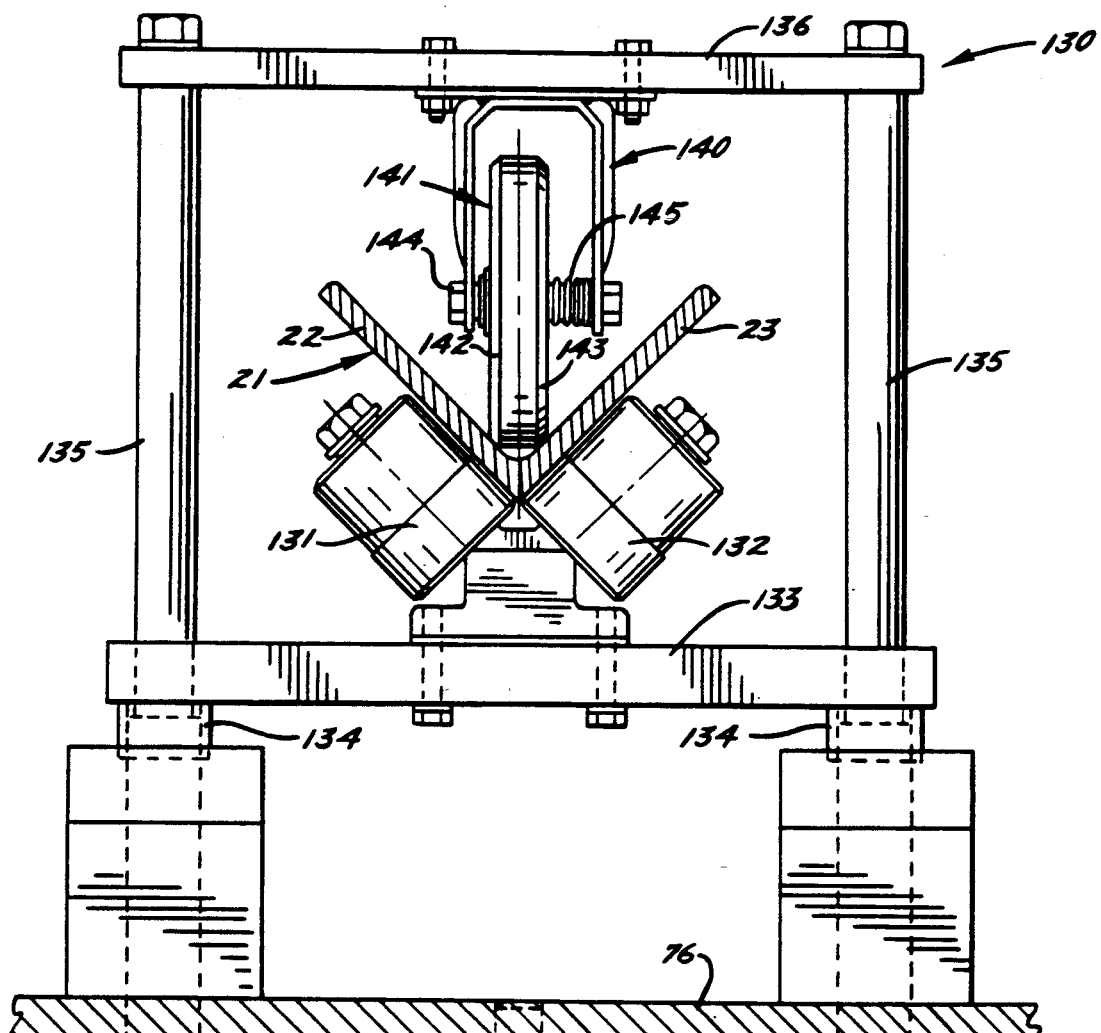

When the machine 20 is running angle iron 21, lowering of the clamping roller 141 causes the left side portion 142 of the roller 141 to engage the left leg 22 of the angle iron thereby to cam the roller 141 a slight distance to the right with respect to the angle iron and center the roller 141 with respect to the angle iron (see FIG. 13). The roller 141 thus clamps the angle iron against the rollers 131 and 132 during operation of the shear 38 and prevents the angle iron from lifting upwardly.

Figure 14:
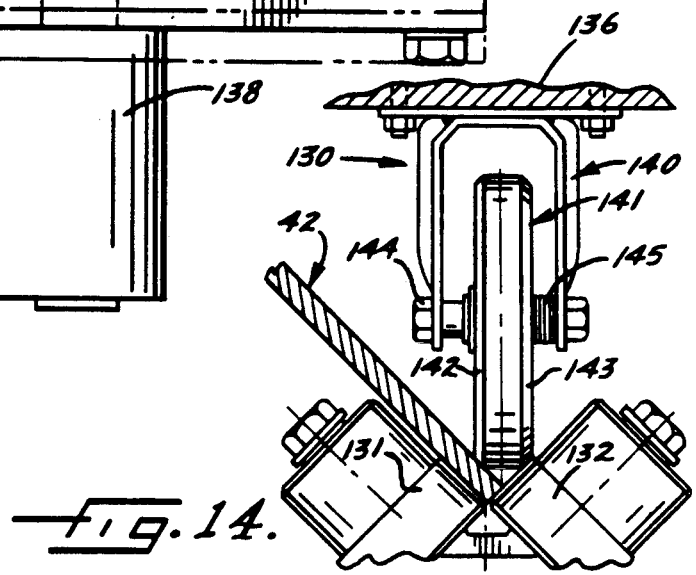
FIG. 14 is a fragmentary view similar to FIG. 13 but shows the machine handling flat stock.

When the machine 20 is running flat stock 42, the lower side of the stock rests against the roller 131 as shown in FIG. 14 while the lower edge of the stock abuts the roller 132. During lowering of the roller 141, the left side portion 142 thereof engages the upper side of the flat stock and cams the roller 142 axially to the right against the bias of the spring 145 and until the right side portion 143 of the roller 142 engages the roller 132 as shown in FIG. 14. The biasing action of the spring 145 causes the left side portion 142 of the roller 141 to press the lower portion of the flat stock 42 against the roller 131 and thereby securely clamp the stock as its leading end portion is cut off by the shear 38.

From the foregoing, it will be apparent that the present invention brings to the art a new and improved machine 20 which is capable of punching and shearing both angle iron 21 and flat stock 42. By utilizing the machine 20, a fabricating shop may save both on capital investment and floor space.

We claim:

1. A machine for punching holes in either an elongated piece of flat stock or an elongated piece of angle stock of substantially V-shaped cross-section, said machine comprising means for supporting said stock for endwise movement along a generally horizontal path, means for advancing the stock intermittently along said path, a punch press positioned along said path and operable to punch a hole in said stock when the latter dwells, said supporting means comprising in part an upwardly opening V-shaped cradle having first and second inclined sides for supporting said angle stock in a position with the V thereof opening upwardly, said first side of said cradle supporting said flat stock in an inclined position in which one edge of the flat stock engages the second side of the cradle, and a mechanism for selectively clamping said stock to said cradle, said mechanism comprising a fluid-operated actuator having a cylinder and having a rod adapted to advance and retract vertically relative to said cylinder, a clamping nose on the lower end of said rod and adapted to engage said stock and clamp said stock against said cradle when said rod is advanced, and means mounting said cylinder for pivoting on said supporting means about an axis located above and extending substantially parallel to said path thereby to enable said nose to tilt as necessary to clamp said stock against said cradle.

2. A machine as defined in claim 1 in which said nose tapers downwardly and tilts to engage the upper side of said flat stock and said second side of said cradle when said nose clamps said flat stock against said cradle.

3. A machine as defined in claim 2 in which said tapered nose is substantially vertical and is centered transversely relative to said cradle when said nose clamps said angle stock against said cradle.

4. A machine as defined in claim 1 in which said advancing means comprises a sheave located below said path and defining a circumferentially extending groove of substantially V-shaped cross-section, said groove having first and second inclined sides of substantially equal length, said sides of said groove engaging said angle stock and supporting said angle stock in a position with the V thereof opening upwardly, said first side of said groove supporting said flat stock in an inclined position in which one edge of the flat stock engages the second side of said groove, means for rotating said sheave about a generally horizontal axis extending transversely of said path thereby to cause said stock to advance along said path, a pinch roller located above said path and engageable with the upper side of said stock to hold said stock against said sheave, said pinch roller being rotatable about a preselected axis extending substantially parallel to the axis of said sheave, and means biasing said pinch roller to move axially along said preselected axis and in a direction away from said first side of said groove.

5. A machine as defined in claim 4 further including a shear spaced downstream from said punch press and operable to cut off the leading end portion of said stock when the stock dwells, said supporting means further comprising a second upwardly opening V-shaped cradle positioned between said punch press and said shear and having first and second inclined sides, said second cradle being located beneath said path with said sides supporting said angle stock in a position with the V thereof opening upwardly, said first side of said second cradle supporting said flat stock in an inclined position in which one edge of the flat stock engages the second side of the second cradle, and a mechanism for selectively clamping said stock to said second cradle, said mechanism comprising a second roller located above said path and engageable with the upper side of said stock to hold said stock against said second cradle as said stock is being cut by said shear, said second roller being rotatable about a generally horizontal axis extending transversely of said path, and means biasing said second roller to move axially along said last-mentioned axis and in a direction away from said second side of said second cradle.

6. A machine as defined in claim 1 further including a shear spaced downstream from said punch press and operable to cut off the leading end portion of said stock when the stock dwells, said supporting means further comprising a second upwardly opening V-shaped cradle positioned between said punch press and said shear and having first and second inclined sides, said second cradle being located beneath said path with said sides supporting said angle stock in a position with the V thereof opening upwardly, said first side of said second cradle supporting said flat stock in an inclined position in which one edge of the flat stock engages the second side of the second cradle, and a mechanism for selectively clamping said stock to said second cradle, said mechanism comprising a roller located above said path and engageable with the upper side of said stock to hold said stock against said second cradle as said stock is being cut by said shear, said roller being rotatable about a generally horizontal axis extending transversely of said path, and means biasing said roller to move axially along said axis and in a direction away from said second side of said second cradle.

7. A machine for punching holes in either an elongated piece of flat stock or an elongated piece of angle stock of substantially V-shaped cross-section, said machine comprising means for supporting said stock for endwise movement along a generally horizontal path and for advancing the stock intermittently along said path, a punch press positioned along said path and operable to punch a hole in said stock when the latter dwells, said supporting and advancing means comprising in part a sheave located below said path and defining a circumferentially extending groove of substantially V-shaped cross-section, said groove having first and second inclined sides of substantially equal length, said sides of said groove engaging said angle stock and supporting said angle stock in a position with the V thereof opening upwardly, said first side of said groove supporting said flat stock in an inclined position in which one edge of the flat stock engages the second side of said groove, means for rotating said sheave about a generally horizontal axis extending transversely of said path thereby to cause said stock to advance along said path, a pinch roller located above said path and engageable with the upper side of said stock to hold said stock against said sheave, said pinch roller being rotatable about a preselected axis extending substantially parallel to the axis of said sheave, and means biasing said pinch roller to move axially along said preselected axis and in a direction away from said first side of said groove.

8. A machine as defined in claim 7 in which said second side of said groove is defined by a first substantially frustoconical surface, said sheave having an extension located axially outwardly of said second side of said groove, said extension having a second substantially frustoconical surface coaxial with and of substantially the same slope as said first frustoconical surface, the smallest diameter of said second frustoconical surface being offset radially inwardly from the largest diameter of said first frustoconical surface whereby said angle stock is prevented from engaging said second frustoconical surface when angle stock is being advanced along said path.

9. A machine as defined in claim 8 in which one side portion of the periphery of said roller engages said flat stock while the opposite side portion of the periphery of said roller engages said second frustoconical surface when flat stock is being advanced along said path.

10. A machine as defined in claim 9 in which the side portions of said roller are substantially frustoconical, have substantially the same slope as said second frustoconical surface, and taper in axially opposite directions.

11. A machine as defined in claim 7 further including a second roller rotatable about an axis extending perpendicular to the upper side of said flat stock, said second roller being located adjacent the other edge of said flat stock and pushing against such edge thereby to press said one edge of said flat stock against the second side of said groove.

12. A machine as defined in claim 11 further including mounting means supporting said second roller for selective retraction away from said other edge of said flat stock.

13. A machine as defined in claim 12 in which said mounting means comprise a slide supported to move back and forth along a path which is inclined at substantially the same slope as said flat stock, and means for moving said slide back and forth along said inclined path thereby to advance said second roller into engagement with and retract said second roller away from said other edge of said flat stock.

14. A machine as defined in claim 7 in which said supporting means further comprise an upwardly opening V-shaped cradle having first and second inclined sides for supporting said angle stock in a position with the V thereof opening upwardly, said first side of said cradle supporting said flat stock in an inclined position in which one edge of the flat stock engages the second side of the cradle, and a mechanism for selectively clamping said stock to said cradle, said mechanism comprising a fluid-operated actuator having a cylinder and having a rod adapted to advance and retract vertically relative to said cylinder, a clamping nose on the lower end of said rod and adapted to engage said stock and clamp said stock against said cradle when said rod is advanced, and means mounting said cylinder for pivoting on said supporting means about an axis located above and extending substantially parallel to said path thereby to enable said nose to tilt as necessary to clamp said stock against said cradle.

15. A machine for punching holes in and shearing either an elongated piece of flat stock or an elongated piece of angle stock of substantially V-shaped cross-section, said machine comprising means for supporting said stock for endwise movement along a generally horizontal path, means for advancing the stock intermittently along said path, a punch press positioned along said path and operable to punch a hole in said stock when the latter dwells, a shear spaced downstream from said punch press and operable to cut off the leading end portion of said stock when the stock dwells, said supporting means comprising in part an upwardly opening V-shaped cradle positioned between said punch press and said shear and having first and second inclined sides, said cradle being located beneath said path with said sides supporting said angle stock in a position with the V thereof opening upwardly, said first side of said cradle supporting said flat stock in an inclined position in which one edge of the flat stock engages the second side of the cradle, and a mechanism for selectively clamping said stock to said cradle, said mechanism comprising a roller located above said path and engageable with the upper side of said stock to hold said stock against said cradle as said stock is being cut by said shear, said roller being rotatable about a generally horizontal axis extending transversely of said path, and means biasing said roller to move axially along said axis and in a direction away from said second side of said cradle.

16. A machine as defined in claim 15 in which one side portion of the periphery of said roller engages said flat stock while the opposite side portion of the periphery of said roller engages the second side of said cradle when flat stock is being cut by said shear.

17. A machine as defined in claim 16 in which the side portions of said roller are substantially frustoconical, having substantially the same slope, and taper in axially opposite directions.

18. A machine as defined in claim 15 in which the first and second sides of said cradle are defined by first and second rollers, respectively, which are inclined so as to define a V beneath said path.

* * * * *